United States Patent
Chen et al.

(10) Patent No.: US 9,473,788 B2
(45) Date of Patent: Oct. 18, 2016

(54) FRAME-COMPATIBLE FULL RESOLUTION STEREOSCOPIC 3D COMPRESSION AND DECOMPRESSION

(75) Inventors: Tao Chen, Palo Alto, CA (US); Samir N. Hulyalkar, I, Los Gatos, CA (US); Gopi Lakshiminarayanan, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 283 days.

(21) Appl. No.: 14/344,308

(22) PCT Filed: Sep. 13, 2012

(86) PCT No.: PCT/US2012/055099
§ 371 (c)(1),
(2), (4) Date: Mar. 11, 2014

(87) PCT Pub. No.: WO2013/040170
PCT Pub. Date: Mar. 21, 2013

(65) Prior Publication Data
US 2014/0341293 A1  Nov. 20, 2014

Related U.S. Application Data

(60) Provisional application No. 61/535,880, filed on Sep. 16, 2011.

(51) Int. Cl.
*H04N 19/597* (2014.01)
*H04N 19/51* (2014.01)
(Continued)

(52) U.S. Cl.
CPC .......... *H04N 19/52* (2014.11); *H04N 13/0048* (2013.01); *H04N 13/0059* (2013.01); *H04N 19/33* (2014.11); *H04N 19/59* (2014.11); *H04N 19/597* (2014.11)

(58) Field of Classification Search
None
See application file for complete search history.

(56) References Cited

U.S. PATENT DOCUMENTS

| 8,619,852 B2 | 12/2013 | Leontaris |
| 2002/0097319 A1 * | 7/2002 | Tam ..................... H04N 19/597 348/42 |

(Continued)

FOREIGN PATENT DOCUMENTS

| EA | 2010/126227 | 11/2010 |
| JP | 2012-044537 | 3/2012 |

(Continued)

OTHER PUBLICATIONS

Aflaki, P. et al "Subjective Study on Compressed Asymmetric Stereoscopic Video" Proc. of the IEEE International Conference on Image Processing, Hong Kong, Sep. 26-29, 2010.

(Continued)

*Primary Examiner* — Christopher S Kelley
*Assistant Examiner* — Kaitlin A Retallick

(57) ABSTRACT

A high resolution 3D Image may be encoded into a reduced resolution image in a base layer and a full resolution unfiltered image in one or more enhancement layers. Encoded asymmetric-resolution image data for the 3D image may be distributed to a wide variety of devices for 3D image processing and rendering. A recipient device may reconstruct the reduced resolution image and the full resolution unfiltered image for 3D image rendering with high subjective perceptual quality due to interocular masking. Full resolution unfiltered images may be alternating between left and right eyes.

20 Claims, 8 Drawing Sheets

(51) Int. Cl.
*H04N 19/52* (2014.01)
*H04N 13/00* (2006.01)
*H04N 19/33* (2014.01)
*H04N 19/59* (2014.01)

(56) References Cited

U.S. PATENT DOCUMENTS

| | | | | |
|---|---|---|---|---|
| 2007/0286283 | A1* | 12/2007 | Yin | H04N 19/70 375/240.16 |
| 2009/0102946 | A1* | 4/2009 | Tischer | H04N 5/235 348/231.99 |
| 2010/0177162 | A1* | 7/2010 | Macfarlane | H04N 13/0059 348/43 |
| 2010/0260268 | A1 | 10/2010 | Cowan | |
| 2011/0074922 | A1* | 3/2011 | Chen | H04N 13/0048 348/43 |
| 2011/0134214 | A1 | 6/2011 | Chen | |
| 2011/0176616 | A1 | 7/2011 | Luthra | |
| 2011/0280316 | A1* | 11/2011 | Chen | H04N 13/0048 375/240.25 |

FOREIGN PATENT DOCUMENTS

| | | |
|---|---|---|
| WO | 2007/047736 | 4/2007 |
| WO | 2010/123862 | 10/2010 |
| WO | 2011/005624 | 1/2011 |
| WO | 2011/094047 | 8/2011 |
| WO | 2011/100735 | 8/2011 |

OTHER PUBLICATIONS

Stelmach, L. et al "Stereo Image Quality: Effects of Mixed Spatial-Temporal Resolution", IEEE Transactions on Circuits and Systems for Video Technology, vol. 10, No. 2, pp. 188-193, Mar. 2000.
ISO/IEC 14496-10:2009 Information Technology—Coding of Audio-Visual Objects—Part 10: Advanced Video Coding; 2009.
Tam, James WA, et al "Stereoscopic Video: Asymmetrical Coding with Temporal Interleaving" Proc. SPIE 4297, Stereoscopic Displays and Virtual Reality Systems VIII, 299, Jun. 22, 2001.
Park, Sea-Nae et al. "View-Dependency Video Coding for Asymmetric Resolution Stereoscopic Views" Journal Optical Engineering, vol. 48, No. 7, pp. 077009, published by SPIE—The International Society for Optical Engineering, published in Jul. 2009.
Chang, Po-Rong, et al "A Wavelet Multiresolution Compression Technique for 3D Stereoscopic Image Sequence Based on Mixed-Resolution Psychophysical Experiments" vol. 15, Issue 9, Jul. 2000, pp. 705-727.
Aflaki, P. et al "Subjective Study on Compressed Asymmetric Stereoscopic Video" Proc. of 2010 IEEE 17th International Conference on Image Processing, Sep. 26-29, 2010, Hong Kong, pp. 4021-4024.
Lee, S et al. "Interlaced MVD Format for Free Viewpoint Video" Proc. SPIE 7863, Stereoscopic Displays and Applications XXII, Feb. 24, 2011, vol. 7863.
Ostermann, Joern "3D Information Coding" 28th Picture Coding Symposium, PCS 2010, Dec. 8-10, 2010, Nagoya, Japan.
Quan, J. et al "Asymmetric Spatial Scalability in Stereoscopic Video Coding" published by IEEE, Piscataway, NJ, USA, May 2011.
Liao, X. et al "A New Scheme of Layered Coding of Stereoscopic Video" 2010 International Conference on Audio Language and Image Processing, Nov. 23-25, 2010, pp. 120-124.
Ozbek, N. et al "Unequal Inter-view Rate Allocation Using Scalable Stereo Video Coding and an Objective Stereo Video Quality Measure" IEEE International Conference on Multimedia and Expo, Jun. 23-26, 2008, pp. 1113-1116.
Brust, H et al. "Mixed Resolution Coding with Inter View Prediction for Mobile 3DTV" 3DTV-Conference: The True Vision Capture, Transmission and Display of 3D Video, Jun. 7, 2010, pp. 1-4.
Dolby Laboratories et al. "Dolby Open Specification for Frame-Compatible 3D Systems" Apr. 4, 2011, pp. 1-11.
Vetro, Anthony et al "3D-TV Content Storage and Transmission" IEEE Transactions on Broadcasting, IEEE Service Center, Piscataway, NJ, USA, vol. 57, No. 2, Jun. 1, 2011, pp. 384-394.
Brust H. et al "Mixed Resolution Coding of Stereoscopic Video for Mobile Devices" Capture, Transmission and Display of 3D Video, IEEE, Piscataway, NJ, USA, May 2009, pp. 1-4.
Stelmach, Lew et al "Stereo Image Quality: Effects of Mixed Spatio-Temporal Resolution" IEEE Transactions on Circuits and Systems for Video Technology, Piscataway, NJ, US, vol. 10, No. 2, Mar. 1, 2000.
Tourapis, Alexandros "Comments on M17925" MPEG Meeting, Oct. 28, 2010, Motion Picture Expert Group or ISO/IEC JTC/SC29/WG11.
ITU-T Telecommunication Standardization Sector of ITU, H.264, Mar. 2009, Series H: Audiovisual and Multimedia Systems, Infrastructure of Audiovisual Services—Coding of Moving Video "Advanced Video Coding for Generic Audiovisual Services".
Liu, S. et al "Asymmetric Stereoscopic Video Encoding Algorithm Based on Subjective Visual Characteristic", IEEE International Conference on Wireless Communications & Signal Processing, Nov. 2009, pp. 1-5.

* cited by examiner

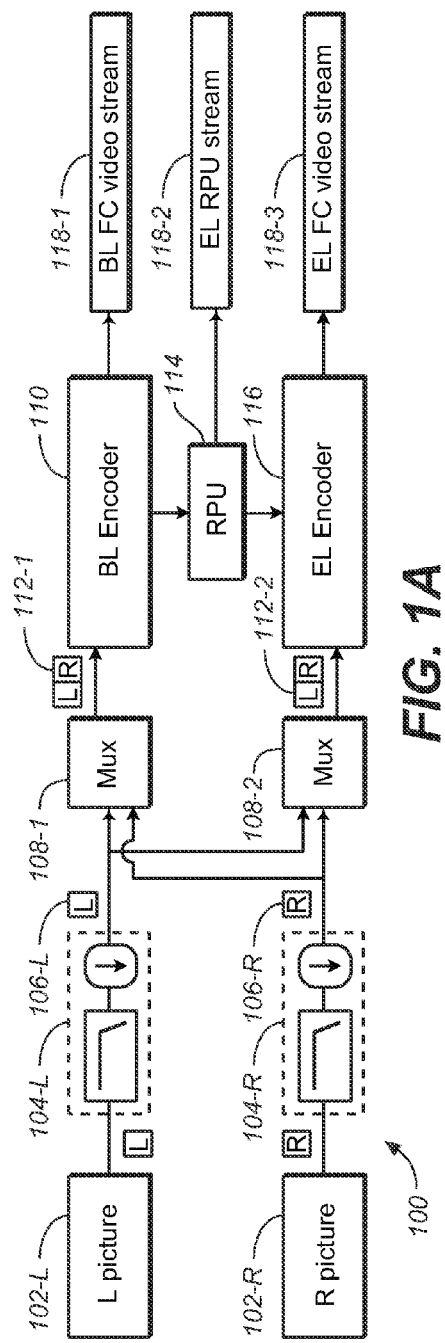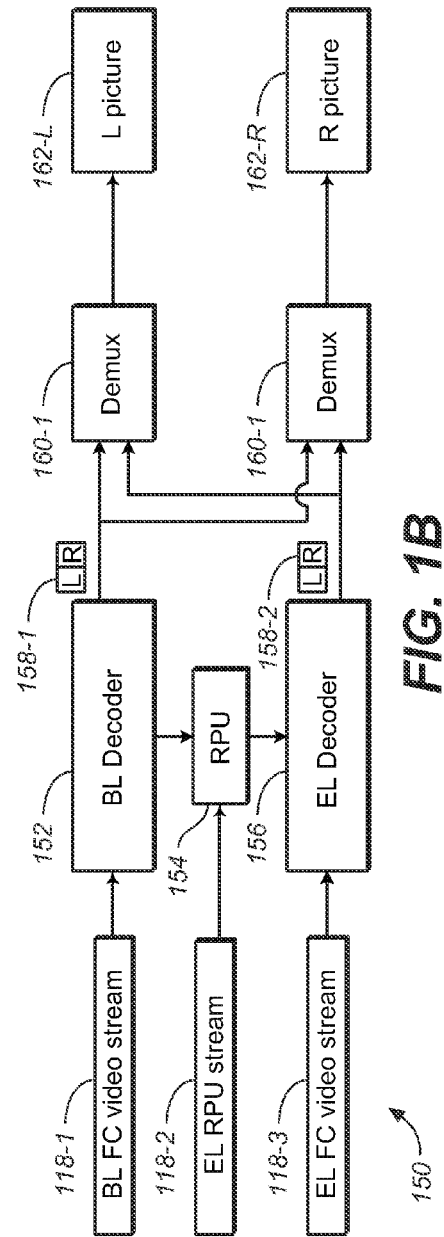

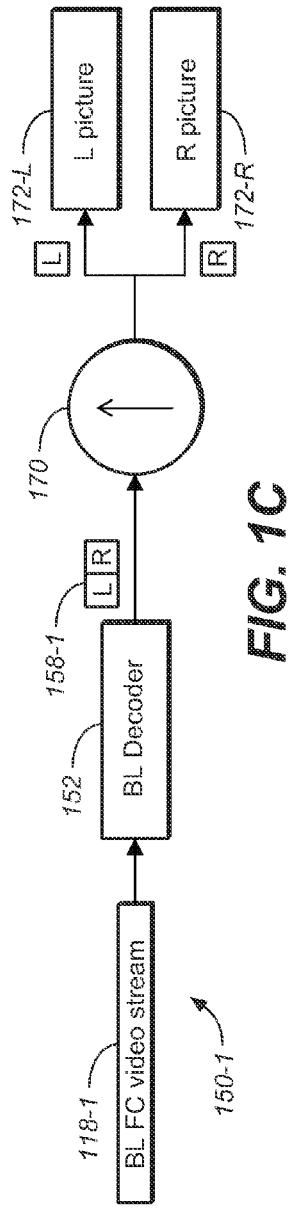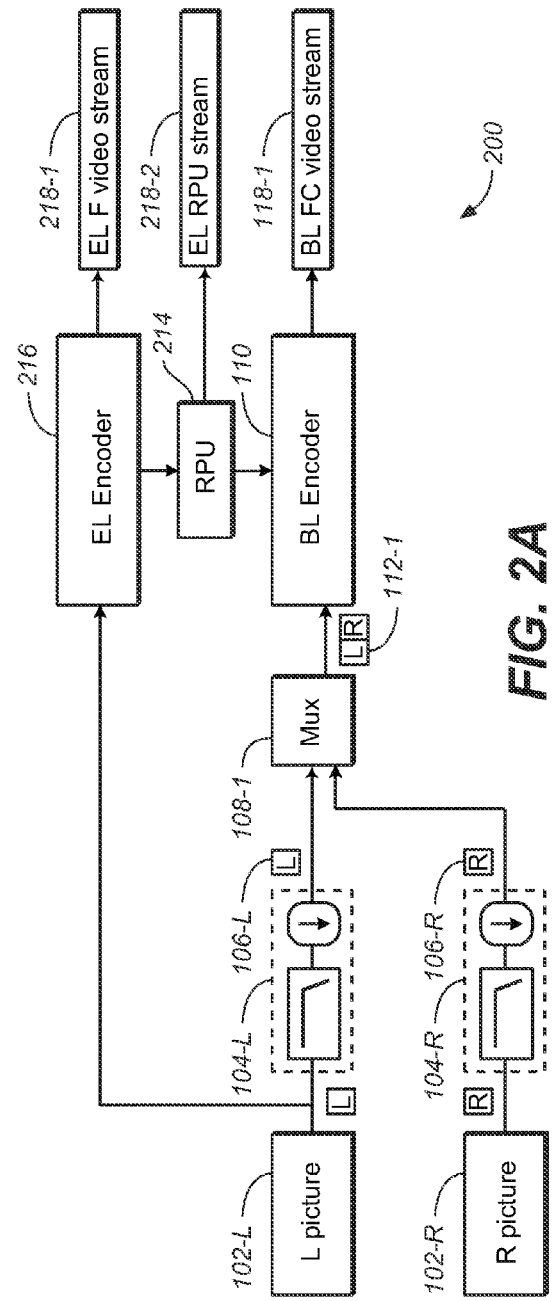

FRAME-COMPATIBLE FULL RESOLUTION STEREOSCOPIC 3D COMPRESSION AND DECOMPRESSION

CROSS-REFERENCE TO RELATED APPLICATIONS

This application claims priority to U.S. Provisional Patent Application No. 61/535,880 filed 16 Sep. 2011, which is hereby incorporated by reference in its entirety.

TECHNOLOGY

The present invention relates generally to image data. More particularly, an example embodiment of the present invention relates to image data for stereoscopic 3D images.

BACKGROUND

Frame-compatible half resolution (FCHR) solutions for 3D content delivery suffer from degraded spatial resolution because the half resolution 3D content only contains half resolution image frames sub-sampled from full resolution 3D image frames.

Frame-compatible full resolution (FCFR) solutions may be used to produce full resolution 3D image frames by sending half resolution 3D image frames through a base layer and sending complementary half resolution 3D image frames through an enhancement layer. The half resolution 3D image frames and the complementary half resolution 3D image frames may be combined by a recipient device into 3D image frames at full resolution.

However, the dual-layer FCFR solutions implement low-pass filtering to reduce/remove aliasing in the half resolution image frames. As high frequency content in the image frames is removed by low-pass filtering, it is not possible for a downstream device to recover all the fine details and textures that were in the high spatial frequency content. While full resolution 3D image frames might still be constructed, the pixels in the 3D image frames would have been irreversibly altered by low-pass filtering and could not be used to reproduce the original resolution and sharpness in original 3D content that gives rise to the 3D image frames.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A illustrates an example multi-layer video encoder, FIG. 1B illustrates an example multi-layer video decoder, and FIG. 1C illustrates an example base-layer video decoder, in connection with encoding or decoding image data with high spatial frequency content filtered/removed;

FIG. 2A illustrates an example multi-layer video encoder that encodes high spatial frequency content for one of left and right eyes but not the other of the eyes.

DESCRIPTION OF EXAMPLE EMBODIMENTS

Figure 2B:
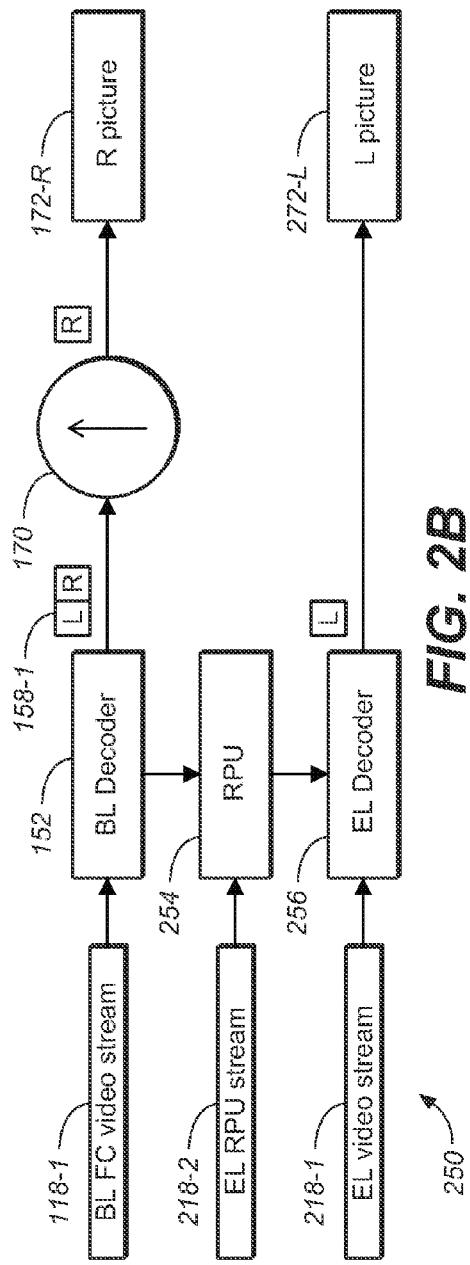
FIG. 2B illustrates an example multi-layer video decoder configured to decode one or more video signals comprising high spatial frequency content for one of left and right eyes but not the other of the eyes.

Example embodiments, which relate to perceptual luminance nonlinearity-based image data exchange across different display capabilities, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MULTI-LAYERED VIDEO DELIVERY WITH FILTERED HIGH SPATIAL CONTENT FOR BOTH EYES
3. MULTI-LAYERED VIDEO DELIVERY WITH UNFILTERED HIGH SPATIAL CONTENT FOR ONE EYE
4. MULTI-LAYERED VIDEO DELIVERY WITH UNFILTERED HIGH SPATIAL CONTENT IN ALTERNATING PERSPECTIVES
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Video data is currently received mostly through network connections, for example, from internet-based content providers. However, the bitrate allocated to a display application such as a 3D display application on a computing device is limited.

To support a widest possible variety of 3D image rendering devices, 3D image content may be delivered as frame compatible 3D image frames (or pictures) with reduced resolutions. As discussed, 3D image frames may be subsampled from full resolution 3D image frames to reduced resolution 3D image frames; high spatial frequency content in the full resolution 3D image frames may be removed by low-pass filters to prevent aliasing in the sub-sampled image frames.

Embodiments of the present invention exploit the perceptual redundancy and inter-ocular masking effect in human vision in the case of stereoscopic 3D viewing. When a 3D image comprising left-eye (LE) and right-eye (RE) image frames of a 3D image with two different spatial resolutions is viewed (at the same time or in a frame-sequential manner), human eyes tend to perceive the 3D image at the higher of the two different spatial resolutions.

Embodiments include encoding and providing resolution-asymmetric 3D image data to downstream devices. To present an individual 3D image in a sequence of 3D images, full resolution unfiltered image data is provided for one of the left and right eyes, while only filtered image data is provided for the other of the left and right eyes.

Because the perception of quality and sharpness of the 3D image is strongly weighted towards the eye viewing the greater spatial resolution image frame when the resolutions differ between the LE and RE image frames, the resolution-asymmetric 3D image data under techniques as described herein requires much less data volume but provides subjective picture quality similar to that of using much more data to provide resolution symmetric 3D image data with full resolution unfiltered image data for both the left and right eyes under other techniques.

In some example embodiments, while frame compatible reduced resolution LE and RE image frames of a 3D image is provided in a base layer to a recipient device, full resolution unfiltered image data of the 3D image for one of left and right eyes is provided in one or more enhancement layers, separate from the base layer, to the recipient device. The full resolution unfiltered image data of the 3D image may be combined by the recipient device with one of the two frame compatible reduced resolution 3D image frames of the 3D image for the same one of the left and right eyes to reconstruct a full resolution unfiltered image frame for the one of left and right eyes.

Codecs implementing techniques as described herein may be configured to include inter-layer prediction capabilities to fully exploit statistical redundancy between one of the reduced resolution filtered image frames in the base layer and a corresponding source image frame. Encoded image data in the enhancement layers may (possibly only) carry residual (or differential) image data, instead of carrying a large amount of full resolution unfiltered image data without exploiting the statistical redundancy in image data of different layers. The residual image data as provided in the enhancement layers enables downstream devices to construct a full resolution unfiltered image frame by adding the residual image data on top of the one of the reduced resolution filtered image frame in the base layer.

In some example embodiments, the codecs may be configured to include inter-view prediction capability used as described in ITU-T Recommendation H.264 and ISO/IEC 14496-10. In some example embodiments, a RPU (reference processing unit) may be used to improve efficiency in inter-layer prediction for enhancement layer compression.

In some embodiments, a full resolution unfiltered image frame for one eye, which preserves high spatial frequency content due to the absence of low-pass filtering, and a reduced resolution (e.g., up-sampled) image frame for the other eye, which does not preserve high spatial frequency content, are presented for viewing. Presentation of full resolution unfiltered image frames may alternate between left and right eyes from one 3D image to the next 3D image. Alternatively and/or optionally, presentation of full resolution unfiltered image frames may alternate between left and right eyes from one scene to the next scene. Alternatively and/or optionally, presentation of full resolution unfiltered image frames may alternate between left and right eyes from one fixed duration to a next fixed duration. In an example embodiment, the fixed duration may be the playback time of one single frame or multiple frames. In an example embodiment, the length of the duration may change from program to program. Other ways of alternating displaying full resolution unfiltered image frame between two eyes may be used.

A parity flag may be provided along with image frames to signal the parity of image data in the enhancement layer. The parity of image data refers to which eye the image data is for. The parity flag may be transmitted as a part of supplemental enhancement information (SEI) or other similar metadata carriages available in video bitstreams.

In some example embodiments, data needed for other applications may also be included with full resolution unfiltered image data in the enhancement layers. In some example embodiments, features, as provided by FCFR technologies commercially available from Dolby Laboratories in San Francisco, Calif., may be supported by the base and enhancement layers as described herein.

Embodiments of the present invention may minimize bandwidth or bitrate usage and preserve frame-compatible 3D image data with reduced resolution, which can support various televisions, displays and other image rendering devices. Moreover, reuse and adaptation features and improvement capability of some available system components allows relatively low cost implementation as compared with other approaches without using techniques as described herein.

In some example embodiments, mechanisms as described herein form a part of a media processing system, including but not limited to: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Multi-Layered Video Delivery with Filtered High Spatial Content for Both Eyes FIG. 1A shows an example multi-layer video encoder (100) that filters/removes high spatial frequency content present in input video sequence, in accordance with an embodiment of the invention. FIG. 1B shows a multi-layer video decoder (150) corresponding to the multi-layer video encoder (100) shown in FIG. 1A, in accordance with the example embodiment.

In an example embodiment, the multiple-layer video encoder (100) is configured to encode an input 3D video sequence that consists of a sequence of 3D input images. A 3D input image in the sequence of 3D images comprises full resolution 3D image data that contains high spatial frequency content. As used herein, the term "full resolution" may refer to a spatial resolution maximally supported by the total number of independently settable pixels in an image frame. The full resolution 3D image data in a 3D input image may be initially decoded by the multiple-layer video encoder (100) into an input LE image frame (102-L) and an input RE image frame (102-R) both of which contain high spatial frequency content.

In an example embodiment, one or more filtering mechanisms (e.g., 104-L and 104-R) in the multi-layer video encoder (100) generate filtered LE and RE image data (106-L and 106-R) based on the input LE and RE image frames (102-L and 102-R). The filtered LE and RE image data (106-L and 106-R) may be generated by removing all, or a substantial part, of the high spatial frequency content from the input LE and RE image frames (102-L and 102-R). Filtering may be performed with one or more low-pass filters (LPFs) in the filtering mechanisms (e.g., 104-L and 104-R). In an example embodiment, filtering as described herein removes or substantially dampens any spatial frequency content in the input images above a threshold frequency that corresponds to a spatial resolution supported by the multi-layer video decoder (150).

As used herein, the term "high spatial frequency content" may refer to high spatial frequency image details that exist in an input 3D video sequence but are removed, for example, by low-pass filters, for anti-aliasing purposes. If the removal of the high spatial frequency content had occurred, it would be irreversible in that downstream devices would not be able to reproduce high resolution image details with filtered image data.

In an example embodiment, one or more samplers (e.g., down-samplers as illustrated in 104-L and 104-R of FIG. 1A with downward-pointing arrows), which may be implemented as a part of, or in addition to, the filtering mechanisms (104-L and 104-R), performs sampling (down-sampling) as a part of generating the filtered LE and RE image data (106-L and 106-R). In an example embodiment, the samplers separate filtered LE image data into two halves, one of which comprises a sub-sampled (e.g., every odd numbered columns or rows) LE image data portion, while the other of which comprises a complementary sub-sampled (e.g., every even numbered columns or rows) LE image data portion. Similarly, the samplers separate filtered RE image data into two halves, one of which comprises a sub-sampled (e.g., every odd numbered columns or rows) RE image data portion, while the other of which comprises a complementary sub-sampled (e.g., every even numbered columns or rows) RE image data portion.

In an example embodiment, one or more multiplexers (e.g., Mux 108-1 and Mux 108-2) multiplex the filtered LE and RE image data (106-L and 106-R) into multiplexed 3D image frames (112-1 and 112-2). A multiplexed 3D image frame (one of 112-1 and 112-2) comprises both a (e.g., down-sampled) image data portion for the left eye and a (e.g., down-sampled) image data portion for the right eye. The multiplexed 3D image frame may be decoded by a downstream device into a LE image frame and a RE image frame of reduced resolutions (e.g., half resolutions), which are less than 100% of the full resolution. Such decoded LE and RE image frames of the reduced resolution may be up-sampled to comprise the same number of pixels as a full resolution image frame with a fuzzier look than a full resolution image not obtained by an up-sampling operation.

In an example embodiment, the multiplexed 3D image frame (112-1) comprises image data for one half (e.g., every other column, or every other row) of the total number of pixels in a full resolution image frame for the left eye and the other half for the right eye, while the multiplexed 3D image frame (112-2) comprises complementary image data for one half (e.g., every other column, or every other row) of the total number of pixels in a full resolution image frame for the left eye and the other half for the right eye. Reduced resolution LE and RE image data portions may be multiplexed within a multiplexed 3D image frame (e.g., one of 112-1 and 112-2) in a side-by-side format, an over-under format, a quincunx format, a checkerboard format, an interleaved format, a combination of the foregoing formats, or another multiplex format.

One or more enhancement layers may be used to carry complementary image data that may be combined with image data in a base layer to produce image frames at or below the full resolution. In an example, the base layer may carry half resolution image frames and the enhancement layers may carry complementary half resolution image frames which may be combined with the half resolution image frames in the base layer to produce image frames at the full resolution by a downstream device. In another example, the base layer compresses and carries one third of the image frames at the full resolution, while the enhancement layers carry the remaining two thirds of the image frames at the full resolution which may be combined with the one third resolution image frames in the base layer to produce image frames at the full resolution by a downstream device. Other variations of decomposing the full resolution into reduced resolutions are also possible.

In an example embodiment, the BL encoder (110) generates, based at least in part on the multiplexed 3D image frame (112-1), a base layer video signal to be carried in a base layer frame compatible video stream (BL FC video stream 118-1), while the EL encoder (116) generates, based at least in part on the multiplexed 3D image frame (112-2), an enhancement layer video signal to be carried in an enhancement layer frame compatible video stream (EL FC video stream 118-3). One or both of the BL encoder (110) and the EL encoder (116) may be implemented using one or more of a plurality of codecs, such as H.264/AVC, VP8, VC-1, and/or others.

An enhancement layer video signal as described herein may be generated using a hybrid video coding method (e.g., implemented by video codecs, such as VC-1, H.264/AVC, and/or others). The image data in the multiplexed 3D image frame 112-2 may be predicted either from neighboring samples in the same image frame (using intra prediction) or from samples from past decoded image frames (inter prediction) that belong to the same layer and are buffered as motion-compensated prediction references within a prediction reference image frame buffer. Inter-layer prediction may also be at least in part based on decoded information from other layers (e.g., the base layer, etc.).

Additionally and/or optionally, the multi-layer video encoder (100) may comprise a reference processing unit (RPU, 114) to perform operations relating to prediction. Prediction as implemented by the reference processing unit (114) may be used to reduce the redundant data and overhead in constructing full resolution 3D image frames in the multi-layer video decoder (150). The RPU (114) may receive and make use of BL image data and other prediction-related information from the BL Encoder 110, and generate a prediction reference image frame through intra or inter prediction.

In those example embodiments that make use of such predictions, the EL encoder (116) generates, based at least in part on the multiplexed 3D image frame (112-2) and the prediction reference image frame, multiplexed 3D image residuals (differences between the prediction reference image frame and the multiplexed 3D image frame 112-2) and stores the image residuals in the enhancement layer video signal to be carried in the EL FC video stream (118-3). Further, the RPU (114) generates, based at least in part on the prediction reference image frame, a reference video signal to be carried in an enhancement layer (EL) RPU stream (118-2).

FIG. 1B shows a multi-layer video decoder (150) that receives input video signals in which high spatial frequency content has been removed from an original video sequence (which may be the input video sequence as discussed in connection with FIG. 1A), in accordance with an embodiment. In an example embodiment, the input video signals are received in multiple layers (or multiple bitstreams). As used herein, the term "multi-layer" or "multiple layers" may refer to two or more bitstreams that carries input video signals having one or more logical dependency relationships between one another (of the input video signals).

In an example embodiment, the multi-layer video decoder (150) is configured to decode one or more input video signals in the BL FC video stream (118-1 of FIG. 1B), EL RPU stream (118-2 of FIG. 1B), and EL FC video stream (118-3 of FIG. 1B) into a sequence of 3D output images. A 3D output image in the sequence of 3D output images as decoded by the multi-layer video decoder (150) does not comprise full resolution unfiltered 3D image data for either eye, as high spatial frequency content in the original video sequence that gives rise to the input video signals has been filtered/removed and can no longer be recovered by the multi-layer video decoder (150).

In an example embodiment, a BL decoder (152) generates, based at least in part on a BL video signal received from BL FC video stream (118-1 of FIG. 1B), a first multiplexed 3D image frame (158-1), while an EL decoder (156) generates, based at least in part on an EL video signal received from EL FC video stream (118-3 of FIG. 1B), a second multiplexed 3D image frame (158-2). One or both of the BL decoder (152) and the EL decoder (156) may be implemented using one or more of a plurality of codecs, such as H.264/AVC, VP8, VC-1, and/or others.

In the embodiments that make use of prediction, a decoder-side RPU (154) generates, based at least in part on a reference video signal received from EL RPU stream (118-2 of FIG. 1B) and/or BL image data from the BL decoder (152), a prediction reference image frame. Further, EL decoder (156) generates, based at least in part on the EL video signal in EL FC video stream (118-3 of FIG. 1B) and the prediction reference image frame from the RPU (154), the second multiplexed 3D image frame (158-2).

The multi-layer video decoder (150) may combine complementary image data received in one or more enhancement layers (e.g., EL RPU stream 118-2 and EL FC video stream 118-3) with image data received in a base layer (e.g., BL FC video stream 118-1) to produce image frames at or below the full resolution. The multi-layer video decoder (150) may support one or more of variations of decomposing the full resolution into reduced resolutions in the base layer and the one or more enhancement layers.

In an example embodiment, one or more demultiplexers (e.g., DeMux 160-1 and 160-2) de-multiplex the multiplexed 3D image frames (158-1 and 158-2) into filtered LE and RE output image frames (162-L and 162-R) at or below the full resolution. While the multiplexed 3D image frame (158-1 and 158-2) comprises image data for both left and right eyes, each of the filtered LE and RE output image frames (162-L and 162-R) is only for one of left and right eyes. A first LE image data portion of reduced resolution in the first multiplexed 3D image frame (158-1) may be combined with a second LE image data portion of reduced resolution in the second multiplexed 3D image frame (158-2) to form the filtered LE output image (162-L) at or below the full resolution. Similarly, a first RE image data portion of reduced resolution in the first multiplexed 3D image frame (158-1) may be combined with a second RE image data portion of reduced resolution in the second multiplexed 3D image frame (158-2) to form the filtered RE output image (162-R) at or below the full resolution.

The filtered LE and RE output image frames at or below the full resolution may be rendered by a display device (which, for example, may comprise the multi-layer video decoder 150) to present an output 3D image. Rendering the filtered LE and RE output image frames may, but is not limited to, be in a frame-sequential manner. Because high spatial frequency content has been filtered out of the video signals as received by the multi-layer video decoder (150), the output 3D image does not contain high spatial frequency image details that may exist in an original 3D image (which may be one of the 3D input images of FIG. 1A).

FIG. 1C shows a base-layer video decoder (150-1) that receives one or more input video signals in which high spatial frequency content has been removed from an original video sequence (which may be the input video sequence as discussed in connection with FIG. 1A), in accordance with an embodiment. In an example embodiment, the base-layer video decoder (150-1) is configured to decode a BL input video signal as received from a base layer (BL FC video stream 118-1 of FIG. 1C) into a sequence of 3D output images, regardless of whether video signals in other layers may be present or not in physical signals received by the decoder. In an example embodiment, the base-layer video decoder (150-1) is configured to ignore any presence of video signals in other streams other than the BL FC video stream (118-1).

A 3D output image in the sequence of 3D output images as produced by the base layer video decoder (150-1) does not comprise full resolution unfiltered 3D image data, as high spatial frequency content in the original video sequence that gives rise to the input video signals has been filtered/removed and cannot be recovered by the multi-layer video decoder (150-1).

In an example embodiment, a BL decoder (152 of FIG. 1C) generates, based at least in part on the BL input video signal in BL FC video stream (118-1 of FIG. 1C), a multiplexed 3D image frame (158-1 of FIG. 1C). The BL decoder (152 of FIG. 1C) may be implemented using one or more of a plurality of codecs, such as H.264/AVC, VP8, VC-1, and/or others.

In an example embodiment, an upsampling unit (170) de-multiplexes and/or separates the multiplexed 3D image frame (158-1) into two image data portions. While the multiplexed 3D image frame (158-1) comprises multiplexed filtered image data for both left and right eyes, the image data portions comprise a filtered LE image data portion and a filtered RE image data portion, each of which is at a reduced resolution below the full resolution. In an example embodiment, the upsampling unit (170) up-samples the filtered LE image data portion to form an upsampled LE filtered output image frame (172-L) below the full resolution. Similarly, the upsampling unit (170) up-samples the filtered RE image data portion to form an upsampled RE filtered output image frame (172-R) below the full resolution. Even though each of the upsampled LE and RE filtered image frames (172-L and -R) may comprise the same number of pixels as a full resolution image frame, the rendered 3D image with the upsampled LE and RE filtered image frames (172-L and -R) has a fuzzier look than a 3D image made up of full resolution LE and RE image frames (162-L and -R of FIG. 1B) not obtained by an up-sampling operation. In addition, the upsampled LE and RE filtered image frames (172-L and -R) do not have high spatial frequency image details removed in the encoding process of the input video signals (which may be derived from, for example, 118-1 through 118-3 of FIG. 1A).

The upsampled LE and RE filtered image frames (172-L and -R) below the full resolution may be rendered by a display device (which for example may comprise the base-layer video decoder 150-1) to present an output 3D image. Rendering the upsampled LE and RE filtered image frames (172-L and -R) may, but is not limited to, be in a frame-sequential manner.

3. Multi-Layered Video Delivery with Unfiltered High Spatial Content for One Eye FIG. 2A shows a multi-layer video encoder (200) that filters high spatial frequency content in input video sequence for one eye but not the other, in accordance with an embodiment. FIG. 2B shows a multi-layer video decoder (250) corresponding to the multi-layer video encoder (200) shown in FIG. 2A, in accordance with the embodiment.

For the purpose of illustration only, FIG. 2A illustrates that the multi-layer video encoder (200) may be used to provide unfiltered high spatial frequency content for the left eye and filtered image data without high spatial frequency content for the right eye in encoded output video signals generated by the multi-layer video encoder (200). The same techniques may be used to implement a multi-layer video encoder that provides unfiltered high spatial frequency content for the right eye and filtered image data without high spatial frequency content for the left eye instead, in encoded output video signals generated by the multi-layer video encoder.

In an example embodiment, the multiple-layer video encoder (200) is configured to encode an input 3D video sequence that consists of a sequence of 3D input images. The full resolution unfiltered 3D image data of a 3D input image in the sequence of 3D images may be decoded into an input left-eye (LE) image frame (102-L) and an input right-eye (RE) image frame (102-R) of the 3D input image.

In an example embodiment, one or more filtering mechanisms (e.g., 104-L and 104-R) in the multi-layer video encoder (200) generates filtered LE and RE image data (106-L and 106-R) based on the input LE and RE image frames (102-L and 102-R). The filtered LE and RE image data (106-L and 106-R) may be removed of high spatial frequency content from the input LE and RE image frames (102-L and 102-R), and may be generated by filtering and/or by down-sampling the input LE and RE image frames (102-L and 102-R).

In an example embodiment, a multiplexer (e.g., Mux 108-1) multiplexes the filtered LE and RE image data (106-L and 106-R) in a multiplexed 3D image frame (112-1). The multiplexed 3D image frame comprises filtered image data for both left and right eyes, and may be decoded by a downstream device into a LE image frame and a RE image frame of reduced resolutions.

In an example embodiment, the multiplexed 3D image frame (112-1) comprises image data for one half (e.g., every odd numbered column or row) of a full resolution LE image frame and image data for one half of a full resolution RE image. Reduced resolution LE and RE image data may be multiplexed within the multiplexed 3D image frame (112-1) in a side-by-side format, an over-under format, a quincunx format, a checkerboard format, an interleaved format, a combination of the foregoing formats, or another multiplex format.

One or more enhancement layers may be used to carry unfiltered high spatial frequency content for the left eye to be used by a downstream device to produce a full resolution LE output image frame with unfiltered high spatial image details for the left eye. In an example, the base layer may carry half resolution image frames and the enhancement layers may carry unfiltered LE image data which may be combined with the half resolution image frames in the base layer to produce image frames at the full resolution by a downstream device. In another example, the base layer compresses and carries one third of the image frames at the full resolution, while the enhancement layers carry the unfiltered LE image which may be combined with the one third resolution image frames in the base layer to produce image frames at the full resolution by a downstream device. Other variations of combining base layer and enhancement layer image data are also possible.

In an example embodiment, the BL encoder (110) generates, based at least in part on the multiplexed 3D image frame (112-1), a base layer video signal to be carried in a base layer frame compatible video stream (BL FC video stream 118-1), while the EL encoder (216) generates, based at least in part on the (unfiltered) input left-eye (LE) image frame (102-L), an enhancement layer video signal with unfiltered high spatial frequency content for the left eye to be carried in an enhancement layer video stream (EL video stream 218-1), which may or may not be frame compatible. One or both of the BL encoder (110) and the EL encoder (216) may be implemented using one or more of a plurality of codecs, such as H.264/AVC, VP8, VC-1, and/or others.

An enhancement layer video signal as described herein may be generated using a hybrid video coding method (e.g., implemented by video codecs, such as VC-1, H.264/AVC, and/or others). The image data of an unfiltered full resolution LE image frame may be predicted either from neighboring samples in the same image frame (using intra prediction) or from samples from past decoded image frames (inter prediction) that belong to the same layer and are buffered as motion-compensated prediction references within a prediction reference image frame buffer. Inter-layer prediction may also be at least in part based on decoded information from other layers (e.g., the base layer, etc.).

Additionally and/or optionally, the multi-layer video encoder (200) may comprise a reference processing unit (RPU, 214) that performs one or more operations relating to prediction. Prediction as implemented by a reference processing unit may reduce the overhead in constructing full resolution unfiltered image frames for the left eye in the multi-layer video decoder (250). The RPU (214) may receive BL image data from the BL Encoder 110, and generate a prediction reference image frame through intra or inter prediction (or estimation).

In the embodiments that make use of prediction, the EL encoder (216) generates, based at least in part on the unfiltered input LE image frame (102-L) and the prediction reference image frame, unfiltered LE image residuals (differences between the prediction reference image frame and the unfiltered input LE image frame 102-L), stores the image residuals in the enhancement layer video signal to be carried in the EL video stream (218-1). Further, the RPU (214) generates, based at least in part on the prediction reference image frame, a reference video signal to be carried in an enhancement layer (EL) RPU stream (218-2).

FIG. 2B shows an example multi-layer video decoder (250) that receives input video signals comprising unfiltered high spatial frequency content for the left eye and filtered image data without high spatial frequency content for the right eye, in accordance with an embodiment. In an example embodiment, the input video signals are received in multiple layers (or multiple bitstreams) comprising a base layer and one or more enhancement layers.

In an example embodiment, the multi-layer video decoder (250) is configured to decode one or more input video signals in the BL FC video stream (118-1 of FIG. 2B), EL RPU stream (218-2 of FIG. 2B), and EL video stream (218-1 of FIG. 2B) into a sequence of 3D output images. In an example embodiment, a 3D output image in the sequence of 3D output images comprises a LE 3D with full resolution unfiltered image details for the left eye, and a RE filtered 3D output image at or below the full resolution.

In an example embodiment, a BL decoder (152) generates, based at least in part on a BL video signal in BL FC video stream (118-1 of FIG. 2B), a multiplexed 3D image frame (158-1 of FIG. 2B), while an EL decoder (256) generates, based at least in part on an EL video signal in EL video stream (218-1 of FIG. 2B), a left eye output image frame (272-L) comprising unfiltered high spatial frequency content existing in an original input video sequence (which may be the input video sequence of FIG. 2A). One or both of the BL decoder (152) and the EL decoder (256) may be implemented using one or more of a plurality of codecs, such as H.264/AVC, VP8, VC-1, and/or others.

In those example embodiments that make use of such predictions, a decoder-side RPU (254) generates, based at least in part on a reference video signal in EL RPU stream (218-2 of FIG. 2B) and/or BL image data from the BL decoder (152), a prediction reference image frame. Further, EL decoder (256) generates, based at least in part on the EL video signal in EL video stream (218-1 of FIG. 2B) and the prediction reference image frame from the RPU (254), the LE output image frame (272-L) comprising unfiltered high spatial frequency content.

In an example embodiment, an upsampling unit (170) de-multiplexes and/or separates the multiplexed 3D image frame (158-1) into two image data portions. While the multiplexed 3D image frame (158-1) comprises multiplexed filtered image data for both left and right eyes, the image data portions comprise a filtered LE image data portion and a filtered RE image data portion, each of which is at a reduced resolution below the full resolution. In an example embodiment, the upsampling unit (170) up-samples the filtered RE image data portion to form an upsampled RE filtered output image frame (172-R) below the full resolution. Even though the upsampled RE filtered image frame (172-R) may comprise the same number of pixels as a full resolution image frame, the upsampled RE filtered image frame (172-R) has a fuzzier look than a full resolution RE image frame (e.g., 162-R of FIG. 1B) not obtained by an up-sampling operation. In addition, the upsampled RE filtered image frame (172-R) does not have high spatial frequency image details removed in the encoding process of the input video signals (which may be derived from, for example, 118-1 of FIG. 2A).

In an example embodiment, the multi-layer video decoder (250) may make use of image data received in one or more enhancement layers including, but not limited to, the reference video signal in EL RPU stream and the EL video signal in the EL video stream with image data received in a base layer to improve the spatial resolution of the upsampled RE output image frame (172-R).

The upsampled RE filtered image frame (172-R) below the full resolution and the LE output image frame (272-L) comprising unfiltered high spatial frequency content may be rendered by a display device (which for example may comprise the multi-layer video decoder 250) to present an output 3D image. Rendering the RE and LE image frames may, but is not limited to, be in a frame-sequential manner.

4. Multi-Layered Video Delivery with Unfiltered High Spatial Content in Alternating Perspectives Eye dominance may differ across populations. Presenting unfiltered full resolution image details only to the same eye (e.g., either the left eye or the right eye) could affect the quality of a 3D viewing experience, e.g., in a subjective or aesthetic sense as related to different populations of viewers. In some example embodiments, unfiltered image frames may be alternating between left and right eyes, which may thus help preserve 3D image quality. For example, one or more first 3D images, each of which comprises a LE image frame with unfiltered high spatial frequency content and a RE filtered image frame without unfiltered high spatial frequency content at a first time, and one or more second 3D images, each of which comprises a RE image frame with unfiltered high spatial frequency content and a LE filtered image frame without unfiltered high spatial frequency content, may be rendered by a display device at a second different time. The alternation between the one or more first 3D images and the one or more second 3D images may occur at different temporal resolutions, as will be further explained later.

Figure 3A:
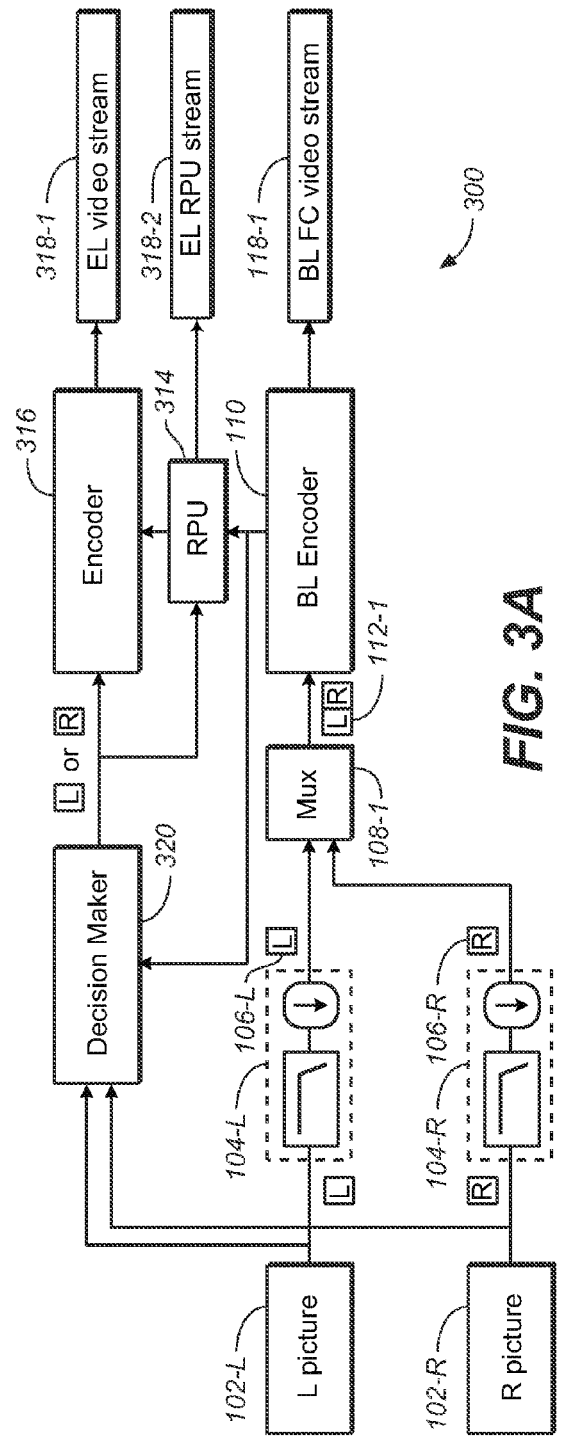
FIG. 3A illustrate an example multi-layer video encoder that alternates encoding high spatial frequency content between left and right eyes.
Figure 3B:
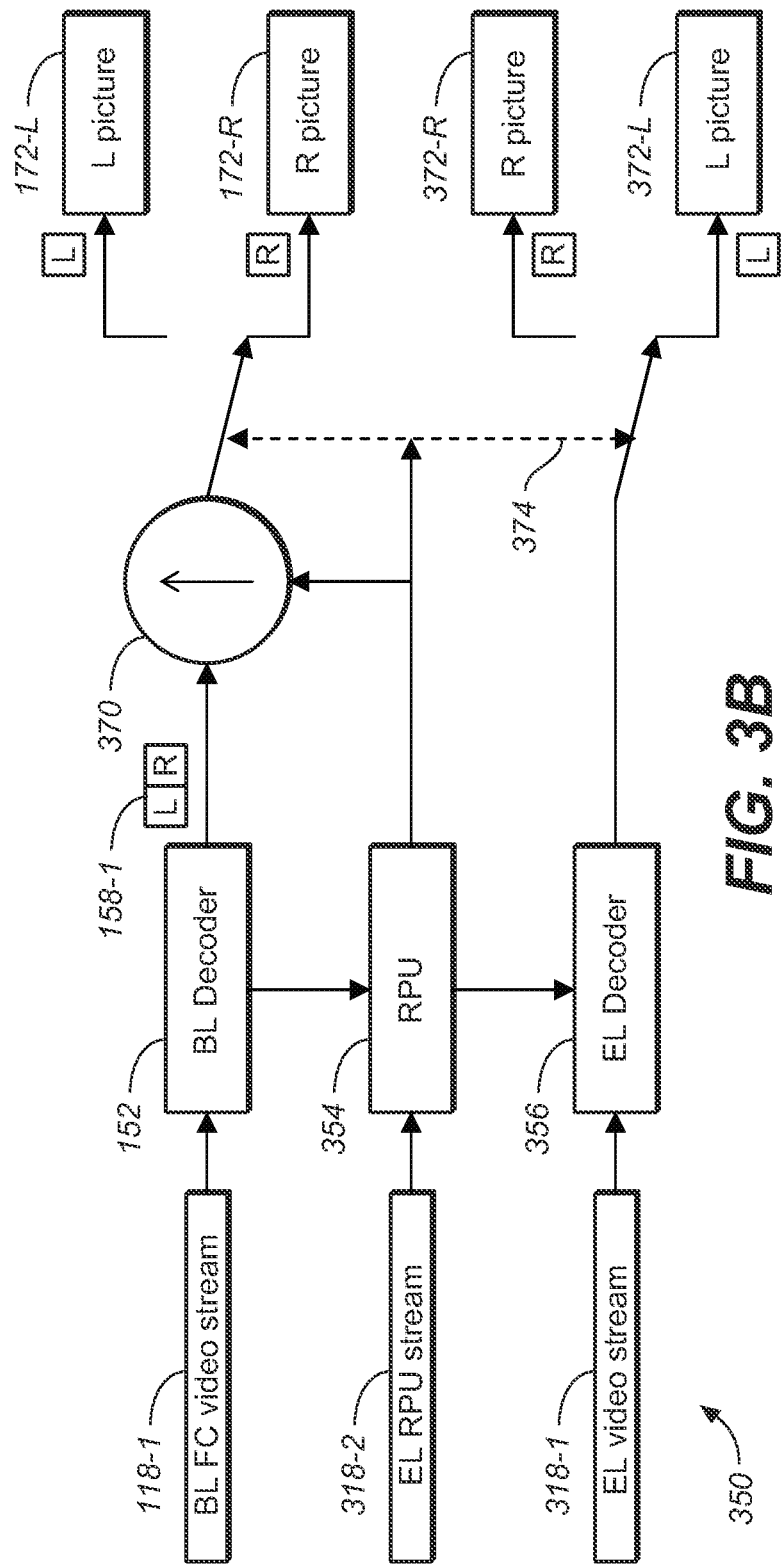
FIG. 3B illustrates an example multi-layer video decoder that decodes one or more video signals comprising high spatial frequency content alternatively encoded between left and right eyes.

FIG. 3A shows a multi-layer video encoder (300) that filters high spatial frequency content in input video sequence for one eye but preserves unfiltered high spatial frequency content for the other eye, in accordance with an embodiment of the present disclosure. FIG. 3B shows a multi-layer video decoder (350) corresponding to the multi-layer video encoder (300) shown in FIG. 3A, in accordance with the embodiment of the present disclosure.

In an example embodiment, the multiple-layer video encoder (300) is configured to encode an input 3D video sequence that consists of a sequence of 3D input images. The full resolution unfiltered 3D image data of a 3D input image in the sequence of 3D images may be decoded into an input left-eye (LE) image frame (102-L) and an input right-eye (RE) image frame (102-R) of the 3D input image.

In an example embodiment, one or more filtering mechanisms (e.g., 104-L and 104-R) in the multi-layer video encoder (300) generates filtered LE and RE image data (106-L and 106-R) based on the input LE and RE image frames (102-L and 102-R). The filtered LE and RE image data (106-L and 106-R) may be removed of high spatial frequency content from the input LE and RE image frames (102-L and 102-R), and may be generated by filtering and/or by down-sampling the input LE and RE image frames (102-L and 102-R).

In an example embodiment, a multiplexer (e.g., Mux 108-1) multiplexes the filtered LE and RE image data (106-L and 106-R) in a multiplexed 3D image frame (112-1). The multiplexed 3D image frame comprises filtered image data for both left and right eyes, and may be decoded by a downstream device into a LE image frame and a RE image frame of reduced resolutions.

In an example embodiment, the multiplexed 3D image frame (112-1) comprises image data for one half (e.g., every odd numbered column or row) of a full resolution LE image frame and image data for one half of a full resolution RE image. Reduced resolution LE and RE image data may be multiplexed within the multiplexed 3D image frame (112-1) in a side-by-side format, an over-under format, a quincunx format, a checkerboard format, an interleaved format, a combination of the foregoing formats, or another multiplex format.

One or more enhancement layers may be used to carry unfiltered high spatial frequency content for one of left and right eyes to be used by a downstream device to produce a full resolution output image frame with unfiltered high spatial image details for the one of left and right eyes. In an example, the base layer may carry half resolution LE or RE image frames and the enhancement layers may carry unfiltered LE or RE image data which may be combined with the half resolution image frames in the base layer to produce image frames at the full resolution by a downstream device. In another example, the base layer compresses and carry one third of LE or RE image frames at the full resolution, while the enhancement layers carry unfiltered LE or RE image which may be combined with the one third resolution image frames in the base layer to produce image frames at the full resolution by a downstream device. Other variations of combining base layer and enhancement layer image data are also possible.

In an example embodiment, the BL encoder (110) generates, based at least in part on the multiplexed 3D image frame (112-1), a base layer video signal to be carried in a base layer frame compatible video stream (BL FC video stream 118-1), while the EL encoder (316) generates, based at least in part on one of the (unfiltered) input LE image frame (102-L) and the (unfiltered) input RE image frame (102-R), an enhancement layer video signal with unfiltered high spatial frequency content for a corresponding eye to be carried in an enhancement layer video stream (EL video stream 318-1), which may or may not be frame compatible. One or both of the BL encoder (110) and the EL encoder (316) may be implemented using one or more of a plurality of codecs, such as H.264/AVC, VP8, VC-1, and/or others.

An enhancement layer video signal as described herein may be generated using a hybrid video coding method (e.g., implemented by video codecs, such as VC-1, H.264/AVC, and/or others). The image data of an unfiltered full resolution LE or RE image frame may be predicted either from neighboring samples in the same image frame (using intra prediction) or from samples from past decoded image frames (inter prediction) that belong to the same layer and are buffered as motion-compensated prediction references within a prediction reference image frame buffer. Inter-layer prediction may also be at least in part based on decoded information from other layers (e.g., the base layer).

Additionally and/or optionally, the multi-layer video encoder (300) may comprise a reference processing unit (RPU 314) that performs one or more operations relating to prediction. Prediction as implemented by a reference processing unit may reduce the overhead in constructing full resolution unfiltered image frames for the one of left and right eyes in the multi-layer video decoder (350). The RPU (314) may receive BL image data from the BL Encoder 110, and generate a prediction reference image frame through intra or inter prediction (or estimation).

In an example embodiment, the multi-layer video encoder (300) comprises a decision maker unit (320) to decide a value for the parity flag of image data in the EL video stream (318-1). A first value (e.g., "L", a binary value, etc.) of the parity flag indicates that the image data in the EL video stream (318-1) comprises unfiltered high spatial frequency content for the left eye, while a second different value (e.g., "R", a binary value, etc.) that the image data in the EL video stream (318-1) comprises unfiltered high spatial frequency content for the left eye. The decision maker unit (320) is configured to decide a value for the parity flag based on one or more of base layer image data, the (unfiltered) input LE image frame (102-L), and the (unfiltered) input RE image frame (102-R). In an example embodiment, the decision maker unit (320) provides the decided value of the parity flag to the RPU (314). The value of the parity flag and identifying information of image frames associated with the value of the parity flag may be signaled (e.g., as a part of SEI) to downstream devices using the EL RPU stream (318-2). In an example embodiment, the decision maker (320) is configured to set up a data flow path for one of the (unfiltered) input LE image frame (102-L) and the (unfiltered) input RE image frame (102-R) that corresponds to the value of the parity flag to be provided to the EL encoder (316). The one of the (unfiltered) input LE image frame (102-L) and the (unfiltered) input RE image frame (102-R) is then encoded by the EL encoder (316) into an EL video signal.

In those example embodiments that make use of such predictions, the EL encoder (316) generates, based at least in part on the one of the unfiltered input LE image frame (102-L) and the unfiltered input LE image frame (102-L) and on the prediction reference image frame, unfiltered image residuals (differences between the prediction reference image frame and the one of the unfiltered input LE image frame (102-L) and the unfiltered input LE image frame (102-L)), stores the image residuals in the enhancement layer video signal to be carried in the EL video stream (318-1). Further, the RPU (314) generates, based at least in part on the prediction reference image frame, a reference video signal to be carried in an enhancement layer (EL) RPU stream (318-2).

Under techniques as described herein, the one or more enhancement layers essentially contain a sequence of unfiltered full resolution LE or RE image frames. For a 3D image that comprises a pair of LE and RE images, only one of the LE and RE images is present with unfiltered high spatial frequency content in the enhancement layers. Encoding image data into the enhancement layer may be made further efficient due to the existence of a large amount of statistical redundancy between image data in the base-layer picture and the image data in the enhancement layers. The statistical redundancy may be exploited for prediction purposes, thereby minimizing the bitrate requirement for the enhancement layers.

The decision maker (320) may be configured to use any of a plurality of different methods to decide a value for the parity flag of unfiltered image data carried in the enhancement layers. In a first example, both LE and RE unfiltered image data of the same 3D image is carried in the enhancement layers.

In a second example, unfiltered image data for only one but not both of left and right eyes of the same 3D image is carried in the enhancement layers at any given time. Unfiltered LE and RE image data may be alternately carried in the enhancement layers at a frame level. For example, first unfiltered LE image data may be carried in the enhancement layers for a first 3D image. The first unfiltered LE image data may be immediately followed in the enhancement layers by second unfiltered RE image data for a second 3D image (e.g., immediately following the first 3D image). The second unfiltered RE image data may be immediately followed in the enhancement layers by third unfiltered image data for a third 3D image (e.g., immediately following the second 3D image). This may be similarly sequenced for additional unfiltered LE and RE image data.

In a third example, unfiltered LE and RE image data may be alternately carried in the enhancement layers at a scene level. First unfiltered LE image data may be carried in the enhancement layers for a first scene in the sequence of 3D images. The first unfiltered LE image data may be immediately followed in the enhancement layers by second unfiltered RE image data for a second scene (e.g., immediately following the first scene) in the sequence of 3D images. The second unfiltered RE image data may be immediately followed in the enhancement layers by third unfiltered LE image data for a third scene (e.g., immediately following the second scene) in the sequence of 3D images. This may be similarly sequenced for additional unfiltered LE and RE image data.

In a fourth example, unfiltered LE and RE image data may be alternately carried in the enhancement layers periodically. First unfiltered LE image data for constructing a first plurality of unfiltered LE image frames may be carried in the enhancement layers for a first time period. The first unfiltered LE image data may be immediately followed in the enhancement layers by second unfiltered RE image data for constructing a second plurality of unfiltered image frames for a second time period (e.g., immediately following the first time period). The second unfiltered RE image data may be immediately followed in the enhancement layers by third unfiltered LE image data for constructing a third plurality of unfiltered image frames for a third time period (e.g., immediately following the second time period). This may be similarly sequenced for additional unfiltered LE and RE image data.

Figure 4:
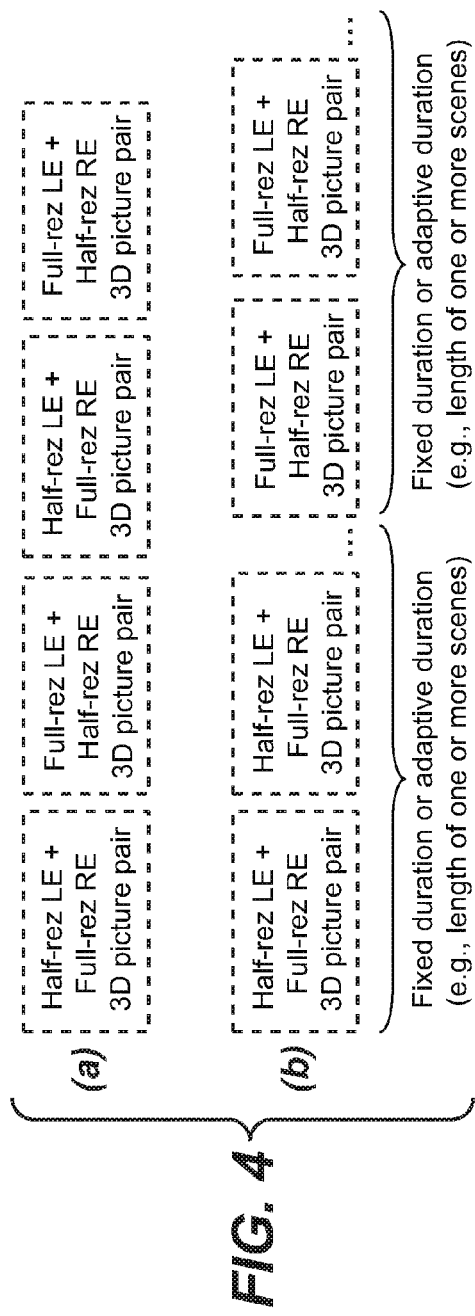
FIG. 4 illustrates example sequences of 3D images that carry high spatial frequency content for an eye that alternates between left and right eyes.

In example embodiments as illustrated in FIG. 4, a sequence of 3D images encoded in the video signals of the base layer and enhancement layers may comprise a sequence of two types of pairs (each of which is a "3D picture pair" as shown in FIG. 4) of image frames. The first type of pair of image frames comprises an unfiltered full resolution RE image frame (Full-resolution RE) and a filtered upsampled LE image frame (Half-resolution LE), while the second type of pair of image frames comprises an unfiltered full resolution LE image frame (Full-resolution LE) and a filtered upsampled RE image frame (Half-resolution RE). Each type of pair of image frames may be used to provide a good basis for further enhancing the spatial resolution of 3D images by post-processing. For example, for one eye (either left or right), both the upsampled and unfiltered full resolution image data is available, and may be used to derive an estimation or prediction to recover high spatial frequency content in image data for the other eye.

FIG. 4(*a*) illustrates a sequence of alternative types of pairs of image frames altering at a frame level as in the second example, while FIG. 4(*b*) illustrates a sequence of alternative types of pairs of image frames alternating at a scene level as in the third example, or at a fixed duration (or time period) as in the fourth example.

In other example embodiments, one or more signal characteristics (e.g., fingerprints, statistical luminance values, motions, chroma features, sharpness, brightness, colors, etc.) of input 3D images (or their LE and RE constituent image frames) may be used by a multi-layer video encoder as described herein to decide a value whether and when to transition to a different value for the parity flag, which indicates a particular one of left and right eyes to which image data in the enhancement layers corresponds. For example, in the case of live action content, original image frames (pictures) captured by different cameras frequently exhibit differences in sharpness, brightness and colors, etc. A multi-layer video encoder as described herein may select a value for the parity flag based on one or more of these signal characteristics sourced or derived from the original image frames so that encoded video signals represent the best 3D viewing experience. Such a decision making process may take into account the results of analyzing the unfiltered full resolution image data in the enhancement layers and filtered image data in the base-layer.

Decisions made by the multi-layer video encoder (300), or the decision maker (320) therein, guide the creation of the enhancement layer bitstream. Therefore, the decisions are transmitted in a signal to downstream devices for them to be used by the downstream devices for correct construction of pairs of LE and RE image frames for 3D viewing. Such a signal may be carried in the EL RPU stream (318-2) or transmitted in other similar ways. Additionally and/or optionally, an index to indicate any needed filtering by downstream devices may be provided to the downstream devices for the purpose of constructing LE or RE output image frames on the video decoder side.

However, it may be possible that users might notice the "flicker" associated with alternating image frames from different eyes, especially if the frame-level alternating method is used. In some example embodiments, this may be ameliorated at the receiver/decoder side via one or more advanced post-processing techniques, for example, by interpolating missing pixels using methods such as motion-estimation-motion-compensation (MEMC), or 3D interpolation techniques.

In some example embodiments, alternating between different eyes in the enhancement layers may be implemented with a small time period (a fraction of a second, a second, two seconds, etc.) of transition. For example, when unfiltered LE image data is altered to unfiltered RE image data in the enhancement layers, a multi-layer video encoder (e.g., 300) as described herein may gradually (in successive frames; to avoid abruptly switching in a single frame) scale down full resolutions of LE unfiltered image frames to a transition resolution comparable (equal, with the same resolution range, with five (5) or another small percentile of difference in resolutions, etc.) to the resolutions of filtered RE image frames in the base layer. When the transition resolution is reached by the LE image frames in the enhancement layers, RE image frames filtered to a starting resolution comparable to the transition resolution are encoded into the enhancement layers (including the EL reference layer in some example embodiments). The multi-layer video encoder (300) may gradually (in successive frames) scale up RE image frames in the enhancement layers from the starting resolution to full resolutions of unfiltered RE image frames.

In some example embodiments, gradually transitioning resolutions when altering image frames in the enhancement layer between different eyes may be performed by a downstream device. For example, a multi-layer video encoder (e.g., 300) may select a filter from a predetermined set of filters. The filter, when applied, may gradually reduce resolutions for one eye and gradually increase resolutions for the other eye in image data carried in the enhancement layers. In an example embodiment, the multi-layer video encoder (300) may include a filter index in RPU data carried in the EL RPU stream. The filter index may be used by a downstream device to look up a preconfigured set of available filters and determine which one of the preconfigured set of available filters should be applied to gradually transitioning resolutions of image frames when the image frames are being altered from one eye to the other in the enhancement layers.

FIG. 3B shows a multi-layer video decoder (350) that receives input video signals comprising unfiltered high spatial frequency content for one of left and right eyes and filtered image data without high spatial frequency content for the other of left and right eyes, in accordance with an embodiment. In an example embodiment, the input video signals are received in multiple layers (or multiple bit-streams) comprising a base layer and one or more enhancement layers.

In an example embodiment, the multi-layer video decoder (350) is provided for decoding one or more input video signals in the BL FC video stream (118-1 of FIG. 3B), EL RPU stream (318-2 of FIG. 3B), and EL video stream (318-1 of FIG. 3B) into a sequence of 3D output images. In an example embodiment, a 3D output image in the sequence of 3D output images comprises a 3D with full resolution unfiltered image details for the one of left and right eyes, and a filtered 3D output image at or below the full resolution for the other of left and right eyes.

In an example embodiment, an RPU (354) is configured to determine, from a reference video signal received in the EL RPU stream (318-2), a value of the parity flag and identifying information of image frames associated with the value of the parity flag in an EL video signal in the EL video stream (318-1).

In an example embodiment, an EL decoder (356) receives from the RPU (354) the value of the parity flag and identifying information of image frames associated with the value of the parity flag in the EL video signal. Based at least in part on an EL video signal in EL video stream (318-1 of FIG. 3B), the EL decoder (356) generates an unfiltered output image frame (one of 372-L and 372-R) for one of left and right eyes which corresponds to the value of parity flag received from the RPU (354). The unfiltered output image frame (one of 372-L and 372-R) comprises unfiltered high spatial frequency content existing in an original input video sequence (which may be the input video sequence of FIG. 3A).

In an example embodiment, the multi-layer video decoder (350) comprises a switch (374) configured to receive the value of the parity flag from the RPU (354) and to switch data flows based on the value of the parity flag. For example, if the value of the parity flag corresponds to the left eye, the unfiltered output image frame corresponds to the left eye. The switch (374) sets up, based on the same value of the parity flag, a corresponding data flow to output the unfiltered output image frame for the left eye as a part of the sequence of 3D output images.

In an example embodiment, a BL decoder (152) generates, based at least in part on a BL video signal in BL FC video stream (118-1 of FIG. 3B), a multiplexed 3D image frame (158-1 of FIG. 3B).

In an example embodiment, an upsampling unit (370) receives from the RPU (354) the value of the parity flag and related information (e.g., identifying information, filter information, etc.) of image frames associated with the value of the parity flag in the EL video signal. Based on the information received from the RPU (354), the upsampling unit (370) retrieves and/or extracts an intermediate filtered image portion corresponding to the other—relative to the image frame decoded by the EL decoder 356—of left and right eyes from the multiplexed 3D image frame (158-1). The intermediate filtered image portion is at reduced resolutions below the full resolution. In an example embodiment, the upsampling unit (170) up-samples the intermediate filtered image portion to form an upsampled filtered output image frame (one of 172-R and 172-L) below the full resolution.

In an example embodiment, the multi-layer video decoder (350) may make use of image data received in one or more enhancement layers including, but not limited to, the reference video signal in EL RPU stream and the EL video signal in the EL video stream with image data received in a base layer to improve the spatial resolution of the upsampled output image frame (one of 172-R and 172-L).

In the embodiments that make use of prediction, the decoder-side RPU (354) generates, based at least in part on a reference video signal in EL RPU stream (318-2 of FIG. 3B) and/or prediction-related information from the BL decoder (152), a prediction reference image frame. Further, EL decoder (356) generates, based at least in part on the EL video signal in EL video stream (318-1 of FIG. 3B) and the prediction reference image frame from the RPU (354), the output image frame (one of 372-L and 372-2) comprising unfiltered high spatial frequency content.

Figure 5:
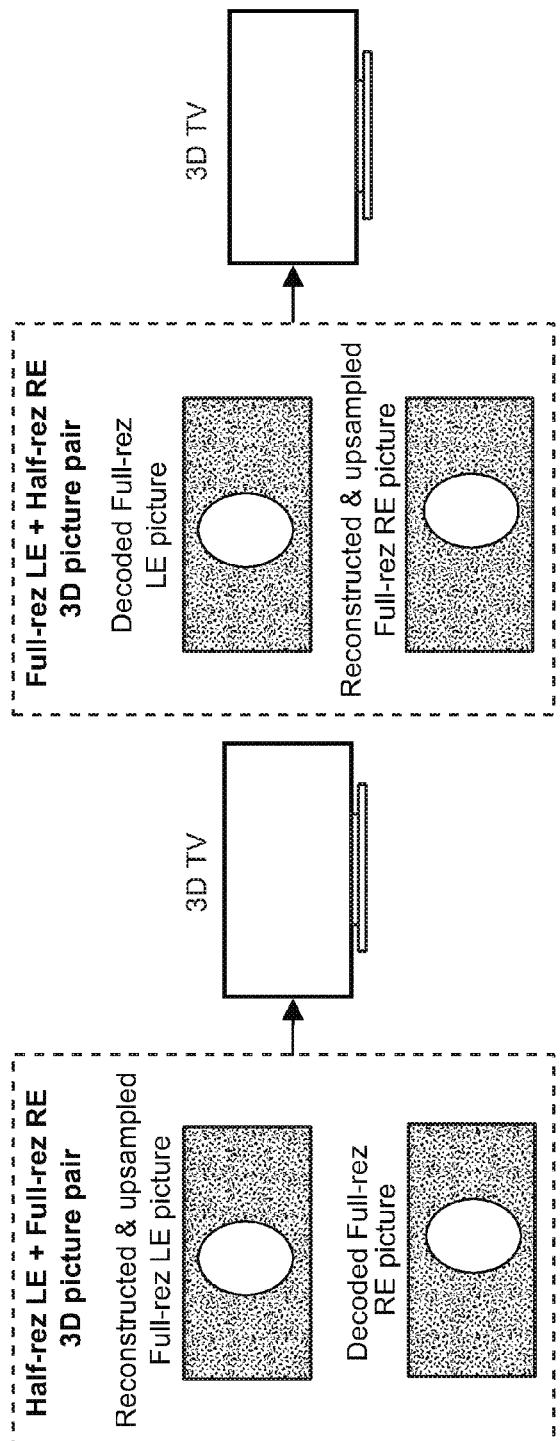
FIG. 5 illustrates example types of 3D images that comprise full resolution unfiltered image frames for one of left and right eyes and half resolution filtered image frames for the other eye.

Under techniques as described herein, the decoded enhancement layers contain a sequence of unfiltered full resolution LE and RE image frames. In an example embodiment as illustrated in FIG. 5, a 3D image may be rendered on a 3D TV with a pair (or "3D picture pair") of an unfiltered full resolution RE image frame (Decoded Full-resolution RE picture or Full-resolution RE) and a filtered upsampled LE image frame (Reconstructed & upsampled Full-resolution LE picture or Half-resolution LE). Similarly, a 3D image may be rendered on a 3D TV with a pair (or 3D picture pair) of an unfiltered full resolution LE image frame (Decoded Full-resolution LE picture or Full-resolution LE) and a filtered upsampled RE image frame (Reconstructed & upsampled Full-resolution RE picture or Half-resolution RE).

The upsampled filtered image frame (one of 172-R and 172-L) below the full resolution and the LE output image frame (one of 272-L and 272-R) comprising unfiltered high spatial frequency content may be rendered by a display device, for example, in a frame-sequential manner.

One or both of the BL decoder (152) and the EL decoder (256) may be implemented using one or more of a plurality of codecs, such as H.264/AVC, VP8, VC-1, and/or others.

Figure 3C:
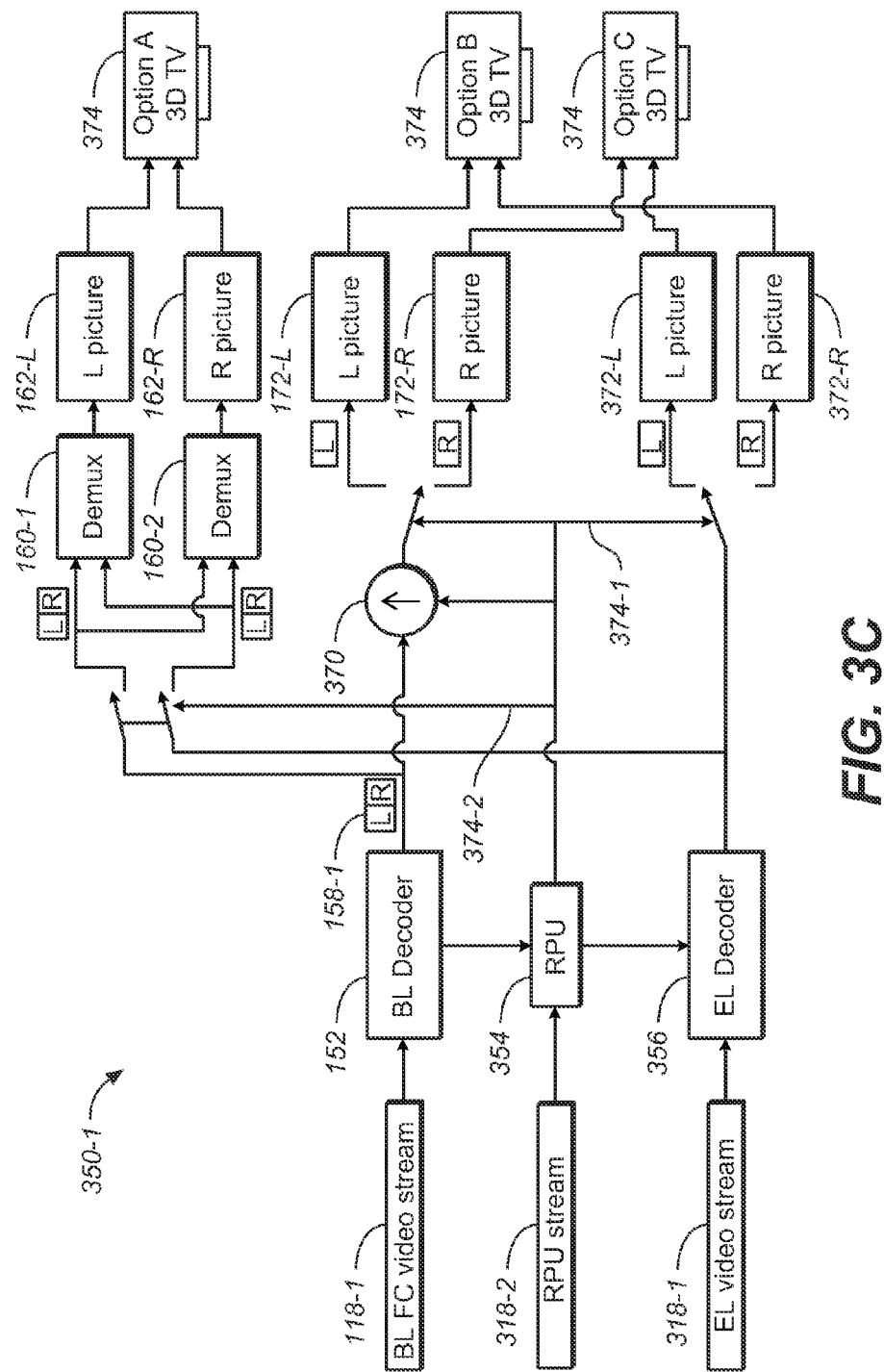
FIG. 3C illustrates an example multi-layer video decoder configured to decode both complementary reduced resolution image data and high spatial frequency content in one or more enhancement layers.

Example embodiments include a more comprehensive framework than that of FIG. 3B. FIG. 3C illustrates a multi-layer video decoding process that may be able to decode any of a plurality of different types of image data encoded in the enhancement layer streams. The plurality of different types of (encoded) image data may include filtered reduced resolution image data for both eyes in the enhancement layers, unfiltered full resolution LE image data in the enhancement layers, unfiltered full resolution RE image data in the enhancement layers, a combination of the foregoing, other types of resolution-asymmetric image data, etc. The parity flag to signal the reconstruction is carried by the RPU stream (318-2). In some example embodiments, for full resolution 3D viewing, three options are available. Under Option A, resolution-symmetric 3D images are provided, which may comprise LE and RE images (162-L and 162-R). Under Options B and C, unfiltered RE or LE image frames are provided to improve perception of the spatial resolution of the 3D images. The choice of sending image data in the enhancement layers corresponding to option A, B, or C may be based on the requirements from different applications. Encoding processing may have the flexibility of determining what types of image data to be transmitted via the enhancement layers. A decision maker (e.g., 320 of FIG. 3A) may be employed to analyze input sequence of 3D images and to select what to send for the best possible 3D viewing experience.

In FIG. 3C, the parity flag from the RPU stream controls the correct reconstruction path of the decoded BL and EL video data. Based on what type of image data exists in the enhancement layers at each time instance, the parity flag may be used to control the operations of switches (374-1 and 374-2) to enable appropriate types of pairs of LE and RE images to be sent to downstream processing, for example, for image rendering on a 3D TV (374).

Additionally and/or optionally, one or more of transform, quantization, entropy coding, image buffering, sample filtering, down-sampling, up-sampling, interpolation, multiplexing, demultiplexing, interleaving, upscaling, downscaling, motion-compensating, disparity estimation, disparity compensation, depth estimation, depth compensation, encoding, decoding, etc., may be performed by a video encoder or decoder as described herein.

Embodiments preserve spatial resolution in stereoscopic 3D images encoded therewith. In some example embodiments, one or more of a backward compatibility with a decoder that is only capable of decoding BL 3D images and a backward compatibility with a decoder that is capable of decoding filtered complementary EL 3D image data are maintained. Thus, in some example embodiments, video signals as described herein may be backward compatible to existing frame-compatible systems for 3D content delivery and may be used with the current FCFR framework. In addition, techniques as described herein provide flexibility of alternating the parity of image frames encoded in the enhancement layers for creating the best reproduction of 3D visual quality.

5. Example Process Flows

Figure 6A:
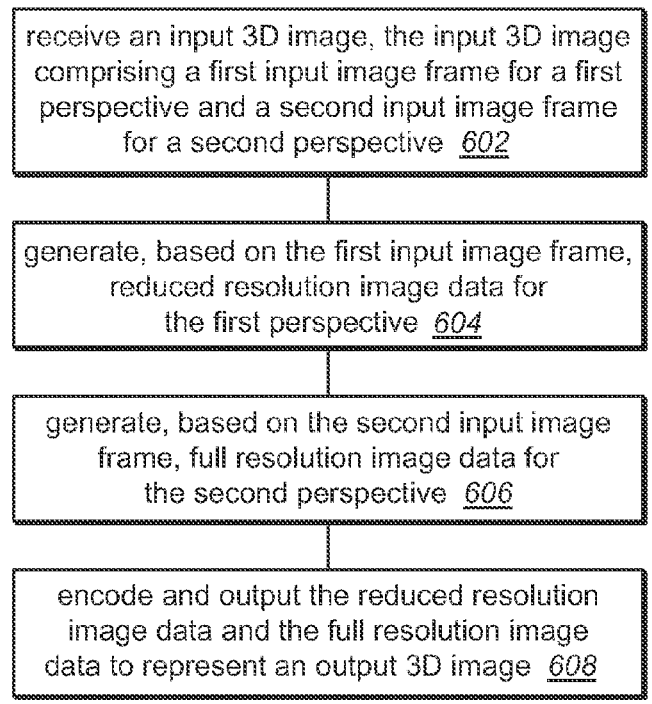
FIG. 6A and FIG. 6B illustrate example process flows, according to example embodiments of the present invention.

FIG. 6A illustrates an example process flow according to an embodiment of the present invention. In some example embodiments, one or more computing devices or components may perform this process flow. In block 602, a multi-layer video encoder (e.g., 300) receives an input 3D image, the input 3D image comprising a first input image frame for a first perspective and a second input image frame for a second different perspective. As used herein, a perspective (e.g., the first perspective or the second perspective) refers to one of a left eye (LE) view and a right eye (RE) view.

In block 604, the multi-layer video encoder (300) generates, based on the first input image frame, reduced resolution image data for the first perspective.

In block 606, the multi-layer video encoder (300) generates, based on the second input image frame, full resolution image data for the second perspective.

In block 608, the multi-layer video encoder (300) encodes and outputs the reduced resolution image data and the full resolution image data to represent an output 3D image. Here, the output 3D image comprises a pair of a reduced resolution output image frame derived from the reduced resolution image data for the first perspective and a full resolution output image frame derived from the full resolution image data for the second perspective.

In an example embodiment, the full resolution output image frame of the 3D output image comprises unfiltered high spatial frequency content derived from the second input image frame, while the reduced resolution output image frame of the 3D output image comprises filtered image data derived from the first input image frame.

In an example embodiment, the 3D input image is a first 3D input image in a sequence of 3D input images comprising a second different 3D input image having a third input image frame for the first perspective and a fourth input image frame for the second perspective; and the multi-layer video encoder (300) further performs generating, based on the fourth input image frame, second reduced resolution image data for the second perspective; generating, based on the first input image frame, second full resolution image data for the first perspective; and encoding and outputting the second reduced resolution image data and the second full resolution image data to represent a second output 3D image, the second output 3D image comprising a second pair of a second reduced resolution output image frame derived from the reduced resolution image data for the second perspective and a full resolution output image frame derived from the full resolution image data for the first perspective.

In an example embodiment, a first value of a parity flag that corresponds to the second perspective is outputted as a part of image data for the output 3D image, while a second different value of the parity flag that corresponds to the first perspective is outputted as a part of image data for the second output 3D image.

In an example embodiment, the parity flag transitions between the first value and the second different value at one of a frame level, a scene level, or a fixed duration level. In an example embodiment, the fixed duration may be the playback time of one single frame or multiple frames. In an example embodiment, the length of the duration may change from program to program.

In an example embodiment, the multi-layer video encoder (300) scales down spatial resolutions of a plurality of full resolution output image frames in a plurality of output 3D images to provide a smooth transition of resolutions for both eyes during a time period in which the parity flag transitions between the first value and the second different value.

In an example embodiment, the reduced resolution image data for the first perspective is in a multiplexed 3D image frame, which further comprises reduced resolution image data for the second perspective. In an example embodiment, the multiplexed 3D image frame is outputted in a base layer output bitstream of a plurality of output bit streams.

In an example embodiment, the multi-layer video encoder (300) further performs generating, based at least in part on the reduced resolution image data for the second perspective, a prediction reference frame; and generating the full resolution image data for the second perspective as differences between the prediction reference frame and the second input image frame. In an example embodiment, the multi-layer video encoder (300) further outputs the prediction reference frame with the reduced resolution image data and the full resolution image data.

In an example embodiment, at least a portion (e.g., unfiltered high spatial frequency content) of the full resolution image data is outputted in one or more enhancement layer output bitstreams of the plurality of output bit streams.

In an example embodiment, the multi-layer video encoder (300) further performs converting one or more 3D input images represented, received, transmitted, or stored with one or more input video signals into one or more 3D output images represented, received, transmitted, or stored with one or more output video signals.

In an example embodiment, at least one of the output 3D image and the input 3D image comprises image data encoded in one of a high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

Figure 6B:
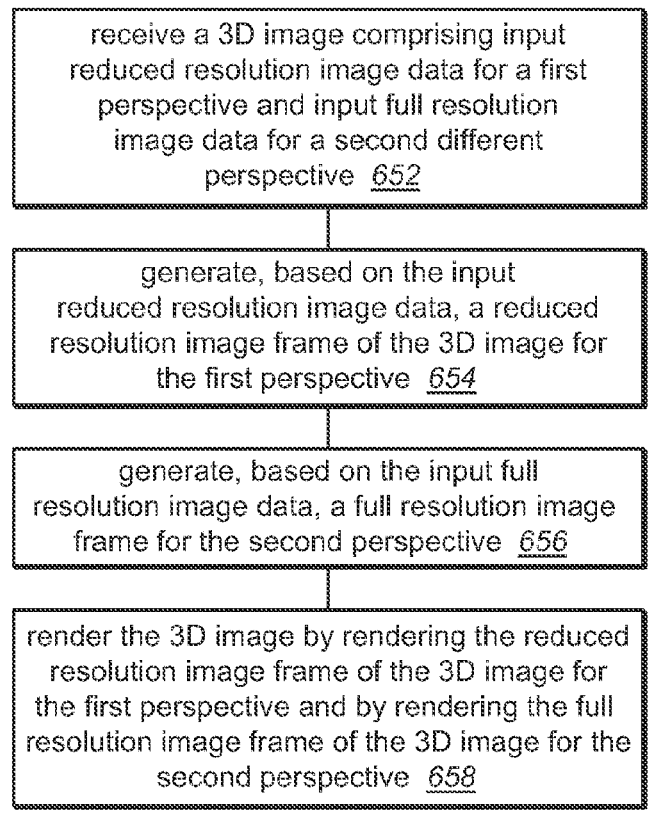

FIG. 6B illustrates another example process flow according to an example embodiment of the present invention. In some example embodiments, one or more computing devices may perform this process flow. In block 652, a multi-layer video decoder (e.g., 350-1) receives a 3D image comprising input reduced resolution image data for a first perspective and input full resolution image data for a second different perspective.

In block 654, the multi-layer video decoder (350-1) generates, based on the input reduced resolution image data, a reduced resolution image frame of the 3D image for the first perspective.

In block 656, the multi-layer video decoder (350-1) generates, based on the input full resolution image data, a full resolution image frame for the second perspective.

In block 658, the multi-layer video decoder (350-1) renders the 3D image by rendering the reduced resolution image frame of the 3D image for the first perspective and by rendering the full resolution image frame of the 3D image for the second perspective.

In an example embodiment, the full resolution image frame of the 3D image comprises unfiltered high spatial frequency content in a source 3D image, while the reduced resolution image frame of the 3D image comprises filtered image data in the source 3D image.

In an example embodiment, the 3D image is a first 3D image in a sequence of 3D images comprising a second different 3D image having second input reduced resolution image data for the second perspective and second input full resolution image data for the first perspective; and the multi-layer video decoder (350-1) further performs generating, based on the second input reduced resolution image data, a second reduced resolution image frame of the second 3D image for the second perspective; generating, based on the second input full resolution image data, a second full resolution image frame for the first perspective; and rendering the second 3D image by rendering the second reduced resolution image frame of the second 3D image for the second perspective and by rendering the second full resolution image frame of the second 3D image for the first perspective.

In an example embodiment, a first value of a parity flag that corresponds to the second perspective is received as a part of image data for the first 3D image, while a second different value of the parity flag that corresponds to the first perspective is received as a part of image data for the second 3D image. In an example embodiment, the parity flag transitions between the first value and the second different value at one of a frame level, a scene level, or a fixed duration level.

In an example embodiment, the multi-layer video decoder (350-1) selects a resolution filter based on a received filter flag to scale down spatial resolutions of a plurality of full resolution output image frames in a plurality of 3D images to provide a smooth transition of resolutions for both eyes during a time period in which the parity flag transitions between the first value and the second different value.

In an example embodiment, the input reduced resolution image data for the first perspective is in an input multiplexed 3D image frame, which further comprises input reduced resolution image data for the second perspective.

In an example embodiment, the input multiplexed 3D image frame is received from a base layer input bitstream of a plurality of input bit streams.

In an example embodiment, the multi-layer video decoder (350-1) further performs generating, based at least in part on the input reduced resolution image data for the second perspective, a prediction reference frame; and generating the full resolution image frame by combining the prediction reference frame and the input full resolution image data.

In an example embodiment, at least a portion of the input full resolution image data is received from one or more enhancement layer bitstreams of the plurality of input bit streams.

In an example embodiment, the multi-layer video decoder (350-1) processes one or more 3D images represented, received, transmitted, or stored with one or more input video signals.

In an example embodiment, the 3D image comprises image data encoded in one of a high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative (DCI), a Reference Input Medium Metric/Reference Output Medium Metric (RIMM/ROMM) standard, an sRGB color space, or a RGB color space associated with the BT.709 Recommendation standard of the International Telecommunications Union (ITU).

In various example embodiments, an encoder, a decoder, a system, etc., performs any or a part of the foregoing methods as described.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
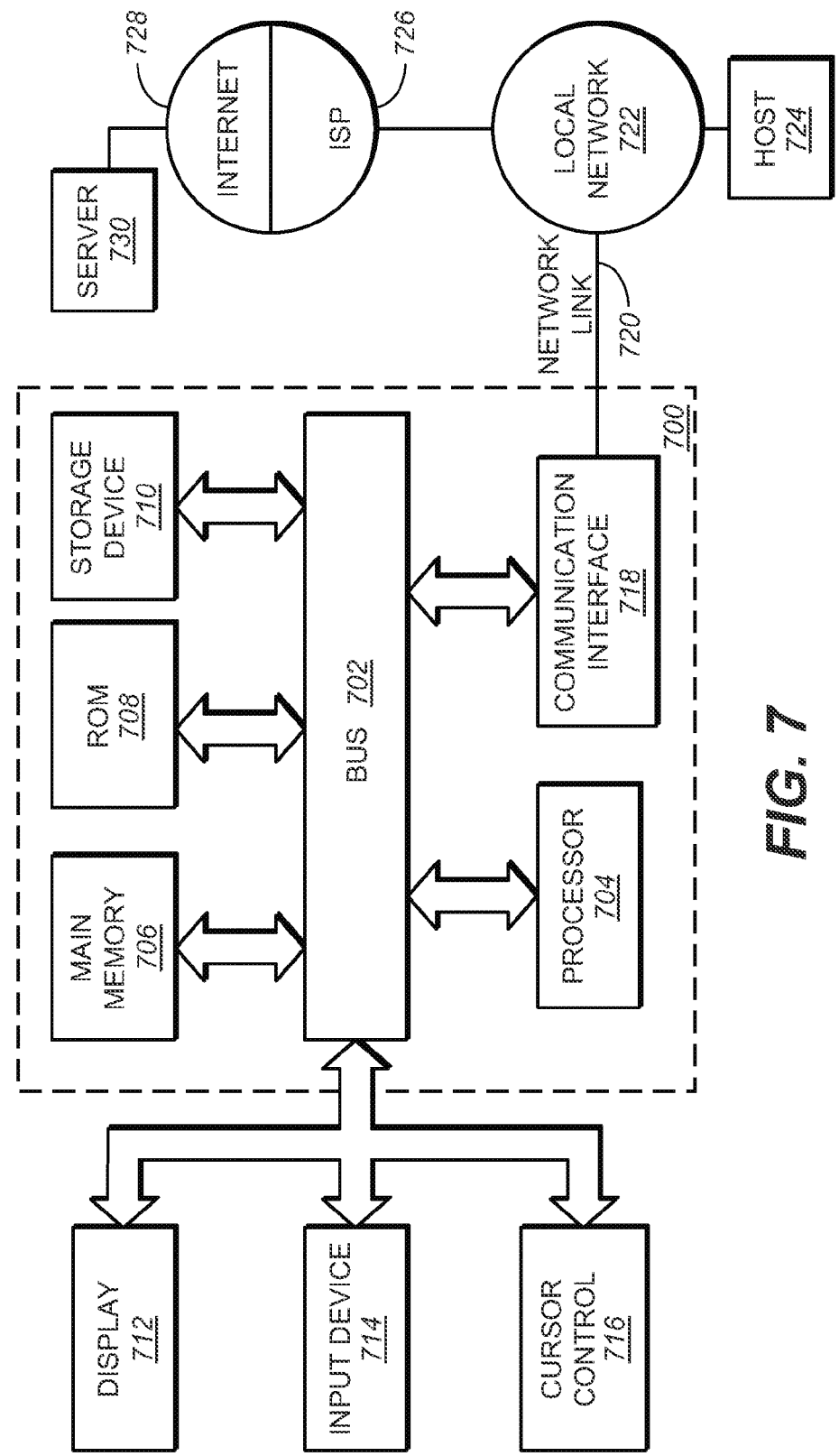
FIG. 7 illustrates an example hardware platform on which a computer or a computing device as described herein may be implemented, according an example embodiment of the present invention.

For example, FIG. 7 is a block diagram that illustrates a computer system 700 upon which an example embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
    receiving an input 3D image, the input 3D image comprising a first input image frame for a first perspective and a second input image frame for a second different perspective; wherein the 3D input image is a first 3D input image in a sequence of 3D input images comprising a second different 3D input image having a third input image frame for the first perspective and a fourth input image frame for the second perspective;
    generating, based on the first input image frame, reduced resolution image data for the first perspective;
    generating, based on the second input image frame, full resolution image data for the second perspective;
    encoding and outputting the reduced resolution image data and the full resolution image data to represent a first output 3D image, the first output 3D image comprising a pair of a reduced resolution output image frame derived from the reduced resolution image data for the first perspective and a full resolution output image frame derived from the full resolution image data for the second perspective;
    generating, based on the fourth input image frame, second reduced resolution image data for the second perspective;
    generating, based on the third input image frame, second full resolution image data for the first perspective; and
    encoding and outputting the second reduced resolution image data and the second full resolution image data to represent a second output 3D image, the second output 3D image comprising a second pair of a second reduced resolution output image frame derived from the second reduced resolution image data for the second perspective and a second full resolution output image frame derived from the second full resolution image data for the first perspective; wherein the presentation of full resolution output image frames in a sequence of output 3D input images comprising the first output 3D image and the second output 3D image alternates between the first and second perspectives;
    wherein between the first output 3D image based on the reduced resolution image data for the first perspective and the full resolution image data for the second perspective and the second output 3D image based on the second reduced resolution image data for the second perspective and the second full resolution image data for the first perspective, the spatial resolution of the image for the second perspective is gradually scaled down over a plurality of frames.

2. The method as recited in claim 1, wherein the full resolution output image frame of the 3D output image comprises unfiltered high spatial frequency content derived from the second input image frame and wherein the reduced resolution output image frame of the 3D output image comprises filtered image data derived from the first input image frame.

3. The method as recited in claim 1, wherein the presentation of full resolution output image frames in the sequence of output 3D input images alternates between the first and second perspectives from one fixed duration to a next fixed duration.

4. The method as recited in claim 1, wherein a first value of a parity flag that corresponds to the second perspective is outputted as a part of image data for the first output 3D image, and wherein a second different value of the parity flag that corresponds to the first perspective is outputted as a part of image data for the second output 3D image.

5. The method as recited in claim 4, wherein the parity flag transitions between the first value and the second different value at one of a frame level, a scene level, or a fixed duration level.

6. The method as recited in claim 4, further comprising scaling down spatial resolutions of a plurality of full resolution output image frames in the sequence of output 3D images to provide a smooth transition of resolutions for both eyes during a time period in which the parity flag transitions between the first value and the second different value.

7. The method as recited in claim 1, wherein the reduced resolution image data for the first perspective is in a multiplexed 3D image frame, the multiplexed 3D image frame further comprising reduced resolution image data for the second perspective.

8. The method as recited in claim 7, wherein the multiplexed 3D image frame is outputted in a base layer output bitstream of a plurality of output bit streams.

9. The method as recited in claim 7, further comprising:
    generating, based at least in part on the reduced resolution image data for the second perspective, a prediction reference frame; and
    generating the full resolution image data for the second perspective as differences between the prediction reference frame and the second input image frame.

10. The method as recited in claim 7, further comprising:
    generating, based at least in part on the reduced resolution image data for the second perspective, a prediction reference frame; and
    encoding and outputting the prediction reference frame with the reduced resolution image data and the full resolution image data.

11. The method as recited in claim 7, wherein at least a portion of the encoded full resolution image data is outputted in one or more enhancement layer output bitstreams of the plurality of output bit streams.

12. The method as recited in claim 1, further comprising converting one or more 3D input images represented, received, transmitted, or stored with one or more input video signals into one or more 3D output images represented, received, transmitted, or stored with one or more output video signals.

13. The method as recited in claim 1, wherein at least one of the first output 3D image and the input 3D image comprises image data encoded in one of a high dynamic range (HDR) image format, a RGB color spaces associated with the Academy Color Encoding Specification (ACES)

standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

14. A method, comprising:
receiving a 3D image comprising input reduced resolution image data for a first perspective and input full resolution image data for a second different perspective; wherein the 3D image is a first 3D image in a sequence of 3D images comprising a second different 3D image having second input reduced resolution image data for the second perspective and second input full resolution image data for the first perspective; wherein the presentation of input full resolution image data in the sequence of 3D images alternates between the first and second perspectives;
wherein between the first output 3D image based on the reduced resolution image data for the first perspective and the full resolution image data for the second perspective and the second output 3D image based on the second reduced resolution image data for the second perspective and the second full resolution image data for the first perspective, the spatial resolution of the image for the second perspective is gradually scaled down over a plurality of frames;
generating, based on the input reduced resolution image data, a reduced resolution image frame of the 3D image for the first perspective;
generating, based on the input full resolution image data, a full resolution image frame for the second perspective;
rendering the 3D image by rendering the reduced resolution image frame of the 3D image for the first perspective and by rendering the full resolution image frame of the 3D image for the second perspective;
generating, based on the second input reduced resolution image data, a second reduced resolution image frame of the second 3D image for the second perspective;
generating, based on the second input full resolution image data, a second full resolution image frame for the first perspective; and
rendering the second 3D image by rendering the second reduced resolution image frame of the second 3D image for the second perspective and by rendering the second full resolution image frame of the second 3D image for the first perspective.

15. The method as recited in claim 14, wherein the full resolution image frame of the 3D image comprises unfiltered high spatial frequency content in a source 3D image; and wherein the reduced resolution image frame of the 3D image comprises filtered image data in the source 3D image.

16. The method as recited in claim 14, wherein the presentation of input full resolution image data in the sequence of 3D images alternates between the first and second perspectives from one fixed duration to a next fixed duration.

17. The method as recited in claim 14, wherein a first value of a parity flag that corresponds to the second perspective is received as a part of image data for the first 3D image, and wherein a second different value of the parity flag that corresponds to the first perspective is received as a part of image data for the second 3D image.

18. The method as recited in claim 17, wherein the parity flag transitions between the first value and the second different value at one of a frame level, a scene level, or a fixed duration level.

19. The method as recited in claim 17, further comprising selecting a resolution filter based on a received filter flag to scale down spatial resolutions of a plurality of full resolution output image frames in the sequence of 3D images to provide a smooth transition of resolutions for both eyes during a time period in which the parity flag transitions between the first value and the second different value.

20. The method as recited in claim 14, wherein the input reduced resolution image data for the first perspective is in an input multiplexed 3D image frame, the input multiplexed 3D image frame further comprising input reduced resolution image data for the second perspective.

* * * * *